3,033,745
PHENOL BACTERICIDE
Irving Rosen, Painesville, Ohio, assignor to Diamond Alkali Company, Cleveland, Ohio, a corporation of Delaware
No Drawing. Filed Aug. 25, 1958, Ser. No. 757,117
5 Claims. (Cl. 167—31)

The present invention relates to new and useful catechol derivatives represented by the structure (I)
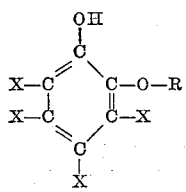

wherein R is an alkyl radical, e.g., straight and branch chain hydrocarbons having from 1 to 10 carbon atoms, i.e., methyl, ethyl, propyl, isopropyl, and the like; X is halogen, i.e., fluorine, chlorine, bromine, and iodine, chlorine being preferred; and to their preparation and application.

Preferred compounds of this invention are 2-methoxy-3,4,5,6-tetrachlorophenol; 2-ethoxy - 3,4,5,6 - tetrachlorophenol; 2-methoxy - 3,4,5,6 - tetrabromophenol; 2-ethoxy-3,4,5,6-tetrabromophenol; and 2 - propoxy - 3,4,5,6-tetrachlorophenol.

The compounds of this invention may be prepared by chemically reacting a tetrahalocatechol, such as tetrachloro and tetrabromocatechol, with a compound of the structure (II)            $(RO)_2$—$SO_2$ wherein R is an alkyl radical as defined. This reaction is typically carried out at a temperature between 0° and 100° C., preferably between 10° and 60° C., over a period of about one-half to 36 hours, e.g., two to five hours. The reactants are normally combined in essentially stoichiometric ratios; however, in certain instances, deviation from this ratio may be desirable. Water is typically employed as a solvent to facilitate the reaction. The chemical combination is preferably carried out in the presence of an inorganic base, such as an alkali metal hydroxide, alkaline earth metal hydroxide or carbonate, such as sodium hydroxide, potassium hydroxide, sodium carbonate, potassium carbonate, and the like. The inorganic base may be combined with the reactants in the ratio of about 2.0 to 2.3 equivalents of base to one mole of tetrahalocatechol. The resultant product may be isolated typically through recrystallization from an organic solvent, such as hydrocarbon or chlorinated hydrocarbon, e.g., hexane, heptane, pentane, benzene, chloroform, carbon tetrachloride, tetrachloroethylene, and trichlorobenzene.

Alternately, the compounds of this invention may be prepared by an alkylation reaction wherein the tetrahalocatechol is chemically reacted with an alkyl halide, i.e., RX, wherein R is an alkyl radical as defined. The generic reaction conditions of this preparation may be found on pages 226–228 of Synthetic Organic Chemistry by Wagner and Zook, published by John Wiley and Sons, New York, 1953.

The compounds of this invention may be employed in a variety of applications, biological or otherwise, such as insecticides, fungicides, miticides, and also as chemical intermediates. These compounds exhibit insecticidal and miticidal activity, i.e., activity in combating aphids, such as the bean aphid, and spider mites; and also exhibit fungicidal activity, such as in the control of blight fungi.

It will be understood, of course, that such compounds may be utilized in diverse formulations both liquid and solid including finely-divided powders and granular materials, solutions, concentrates, emulsifiable concentrates, slurries, and the like, depending upon the application intended and the formulation medium desired.

Thus, it will be appreciated that compounds of this invention may be employed to form biologically-active substances containing such compounds as essential active ingredients thereof, which compositions may also include finely-divided dry or liquid diluents, extenders, fillers, conditioners, including various clays, diatomaceous earth, talc, spent catalyst, alumina-silica materials, and incorporating liquid solvents, diluents, etc., typically water and various organic liquids, such as kerosene, benzene, toluene, cyclohexanone, carbon tetrachloride, carbon disulfide, chlorinated benzene, chloroform, and other petroleum distillate fractions for mixtures thereof.

When liquid formulations are employed or dry materials prepared which are to be used in liquid form, it is desirable in certain instances additionally to employ a wetting, emulsifying or dispersing agent to facilitate use of the formulation, suitable surface active agents being set forth, for example, in an article by John W. McCutcheon in Soap and Chemical Specialities, vol. 31, Nos. 7–10, 1955.

The term "carrier" as employed in the specification and claims is intended to refer broadly to materials constituting a major proportion of a biologically active or other formulation and hence includes finely-divided materials, both liquids and solids as aforementioned, conventionally used in such applications.

The compounds of the present invention may also be used alone or in combination with other known biologically-active materials, such as chlorinated hydrocarbons, organic phosphorus pesticides, foliage and soil fungicides, fertilizers, pre- and post-emergent herbicides, and the like.

In order that those skilled in the art may more completely understand the present invention and the preferred methods by which the same may be carried into effect, the following specific examples are offered:

EXAMPLE I

*Preparation of 2-Methoxy-3,4,5,6-Tetrachlorophenol*

75 g. (0.3 mol) tetrachlorocatechol and 26 g. (0.65 mol) sodium hydroxide in 300 ml. $H_2O$ are mixed in a flask equipped with condenser, stirrer, and dropping funnel. The stirrer is started as 41.6 g. (0.33 mol) of dimethyl sulfate is added slowly through the dropping funnel. When the addition is complete the mixture is stirred for two hours. The resultant solid (tetrachlorodimethoxybenzene) is removed by filtration. The filtrate and washings from this filtration are acidified with HCl to precipitate the crude product, which is filtered off. The crude methoxy-tetrachlorophenol is extracted with boiling hexane to separate it from the insoluble tetrachlorocatechol, and filtered. The hexane solution from this extraction step is cooled and filtered and the solid, M.P. 102°–108° C., is dissolved again in boiling benzene, treated with decolorizing carbon, and allowed to recrystallize. Two more recrystallizations using boiling hexane result in the desired pure 2-methoxy-3,4,5,6-tetrachlorophenol, M.P. 122°–123° C. This desired $C_7H_4Cl_4O_2$ is insoluble in water, soluble in acetone, cyclohexanone, and xylene and its identity is indicated by the following elemental analytical data:

| Element | Actual, percent by Wt. | Calculated, percent by Wt. |
|---|---|---|
| C | 32.38 | 32.10 |
| H | 1.72 | 1.54 |
| Cl | 54.6 | 54.15 |

EXAMPLE II

To evaluate miticidal activity a test is carried out whereby adult 2-spotted spider mites *Tetranychus bimaculatus*, maintained on Tendergreen bean plants under controlled conditions, are transferred from a stock culture by leaf cuttings to uninfested seedlings of bean plants in 2½" pots the day prior to testing. Formulation of the test chemical (2000 and 1000 p.p.m. 2-methoxy-3,4,5,6-tetrachloropheol—5% acetone—0.01% Triton X-155—balance water) is sprayed onto the infested test plants. Counts are made after two days, showing 100% mortality at both the 2000 and 1000 p.p.m. concentrations.

EXAMPLE III

Aphicidal utility is shown in the following test: the bean aphid, *Aphis fabae*, is cultured on nasturtium plants. (No attempt is made to select insects of a given age in this test.) Test pots are prepared by reducing the number of nasturtium plants in 2½" culture pots until those remaining are infested with approximately 100 aphids. The infested test plants are treated with a formulation of the test chemical (2000 p.p.m. product of Example I—5% acetone—0.01% Triton X-155—balance water); based on counts 24 hours after exposure, significant mortality is observed.

EXAMPLE IV

Fungicidal spore germination tests on glass slides are conducted by the test tube dilution method adopted from the procedure recommended by the American Phytopathological Society's Committee on Standardization of Fungicidal Tests. In this procedure, the product of Example I, in aqueous formulation at concentrations of 1000, 100, 10, and 1.0 p.p.m., is tested for its ability to inhibit germination of spores from 7 to 10-day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Using this procedure, results indicate that at a concentration range of 10 to 100 p.p.m., disease control of both the *A. oleracea* and *M. fructicola* is attained.

EXAMPLE V

The following test measures the ability of the test chemical to protect pea seeds and seedlings from seed decay and damping off fungi (Pythium and Fusarium species). In this test infested soil in 4 x 4 x 3-inch plant band boxes is treated by soil drench mix method at the equivalent rate of 128 pounds per acre. Treatment is accomplished by pouring 70 ml. of a test formulation (2000 p.p.m. product of Example I—5% acetone—0.01% Triton X-155) on the surface of the soil. This is allowed to stand until the next day when the soil is removed from each box and thoroughly mixed before being replaced in the box. Three days after treatment, 25 variety Perfection, pea seeds are planted to a uniform depth in each box. Untreated infected checks and standardized material are included in each test in addition to an untreated check using sterilized soil. Percentage stand recorded 14 days after planting shows 1% on the untreated control and better than 40% stand of the plants treated with the product of Example I.

EXAMPLE VI

Herbicidal activity is evaluated using seeds of perennial rye grass and radish which are treated in Petri dishes with aqueous suspensions of the test chemical at 1000 and 100 p.p.m. (i.e., 1000 p.p.m. and 100 p.p.m product of Example I—5% acetone—0.01% Triton X-155—balance water). Lots of 25 seeds of each type are scattered in separate dishes containing filter paper discs moistened with 5 ml. of the test formulation at each concentration. After 7 to 10 days under controlled conditions, the test compound is given a rating which corresponds to the concentration that inhibits germination of half the seeds in the test. Using this procedure the product of Example I inhibited radish germination at the concentration rage of 100 to 1000 p.p.m. and at 10 to 100 p.p.m. for the rye grass.

EXAMPLE VII

To further test herbicidal effectiveness, tomato plants, variety Bonny Best, 5" to 7" tall; corn, variety Cornell M-1 (field corn), 4" to 6" tall; bean, variety Tendergreen, just as the trifoliant leaves are beginning to unfold; and oats, variety Clinton, 3" to 5" tall, are sprayed with an aqueous test formulation (6400 p.p.m. product of Example I—5% acetone—0.01% Triton X-155—balance water). The plants are sprayed with 100 ml. at 40 pounds air pressure while being rotated on a turntable in a spray hood. Records are taken 14 days after treatment and phytotoxicity is rated on a scale of from 0 to no injury to 11 for plant kill. Using this procedure ratings of 5, 10, 6, and 7 are received for the tomato, bean, corn, and oat plants, respectively.

EXAMPLE VIII

Further herbicidal testing is carried out using cotton plants approximately two months old grown in 5" pots. The plants are sprayed with 100 ml. of a test formulation (2% product of Example I—0.01% Triton X-155—5% acetone—remainder water). Seven and 14 days after treatment evaluations are made of four replications with a combined range of 23 to 29 leaves per treatment. Data indicates that all the leaves on the plant are killed and the plant is 23% defoliated.

EXAMPLE IX

To evaluate bactericidal activity, the test chemical at a concentration of 256 p.p.m. is mixed with distilled water, containing 5% acetone, and 0.01% Triton X-155. Five ml. of the test formulation is put in each of four test tubes. To each test tube is added one of the organisms: *Erwinia amylovora*, *Xanthomonas phaseoli*, *Stapylococcus aureus*, and *Escherichia coli* in the form of bacterial suspensions in a saline solution from potato-dextrose agar plates. The tubes are then incubated for four hours at 30° C. Transfers are then made to sterile broth with a standard 4 mm. loop and the thus-inoculated broth is incubated for 48 hours at 37° C. when growth is rated as follows: A=no growth, B=slight, C=moderate, and D=heavy growth. Using this procedure the product of Example I receives ratings of B, A, B, A for the above microorganisms in their respective order.

It is to be understood that although the invention has been described with specific reference to particular embodiments thereof, it is not to be so limited since changes and alterations therein may be made which are within the full intended scope of this invention as defined by the appended claims.

What is claimed is:

1. The method of preparing catechol derivatives represented by the structure

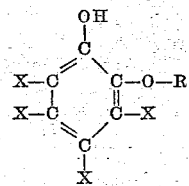

which comprises reacting at a temperature between 0° and 100° C. tetrahalocatechol with an essentially stoichiometric amount of a compound of the structure

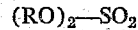

wherein R is an alkyl radical and X is halogen.

2. The method according to claim 1 wherein X is chlorine.

3. The method of preparing 2-methoxy-3,4,5,6-tetrachlorophenol which comprises reacting approximately stoichiometric amounts of tetrachlorocatechol and dimethyl sulfate at a temperature between 0° and 100° C.

4. The method according to claim 3 wherein an alkaline condensing agent is employed.

5. The method of controlling bacteria growth which comprises contacting said bacteria with an active amount of 2-methoxy-3,4,5,6-tetrachlorophenol.

References Cited in the file of this patent

King: U.S. Dept. Agr. Handbook No. 69, May 1954, pp. 259, 261 and 262.

Fort et al.: Chemical Abstracts, vol. 50 (1956), pp. 2467–2468.

Frear: Chemistry of the Pesticides, 3rd ed. (1955), pp. 384–385.